Oct. 12, 1937.                    A. O. AUSTIN                    2,095,306
                                  MARKER LIGHT
                             Filed Oct. 10, 1932          4 Sheets-Sheet 1

INVENTOR
Arthur O. Austin.
BY Alpheus J. Crane
ATTORNEY

Oct. 12, 1937.  A. O. AUSTIN  2,095,306
MARKER LIGHT
Filed Oct. 10, 1932  4 Sheets-Sheet 4

INVENTOR
Arthur O. Austin.
BY Alpheus J. Crane
ATTORNEY

Patented Oct. 12, 1937

2,095,306

UNITED STATES PATENT OFFICE 2,095,306

MARKER LIGHT

Arthur O. Austin, near Barberton, Ohio, assignor, by mesne assignments, to The Ohio Brass Company, Mansfield, Ohio, a corporation of New Jersey Application October 10, 1932, Serial No. 637,078

4 Claims. (Cl. 177—352)

This invention relates to lighting devices and particularly to means for lighting transmission lines to prevent interference with aircraft.

One object of the invention is to provide economical and efficient means for marking electrical transmission lines so that they will not interfere with aerial navigation.

Another object of the invention is to provide an efficient source of energy for supplying the lighting elements taken from the transmission line itself.

Other objects and advantages will appear from the following description.

The invention is exemplified by the combination and arrangement of parts shown in the accompanying drawings and described in the following specification, and it is more particularly pointed out in the appended claims.

For reasons of safety, it is desirable to mark or indicate high structures, particularly electrical transmission lines, with lights so that aircraft will not collide with the towers or conductors. It is well known that lights such as neon lights or lights similar to Geisler tubes can be readily illuminated by relatively small currents at high voltage. In many cases they can be given a certain amount of illumination by simply placing them so that the electrostatic field set up by the conductor will cause current to flow through the tubes. In general, however, methods of this kind are open to objections as the light may be limited as to intensity, and maintenance may be a serious factor.

One means for energizing marker lights for transmission lines is a conductor such as that commonly used for carrier current work; this conductor acting as a capacitance coupling with the main conductor. In general, however, this is open to serious objections as the extra conductor imposes increased mechanical loads upon the structures and may require greater height of the transmission towers, all of which greatly increases the cost and makes it difficult to apply the arrangement to existing lines. In one form of my invention, this difficulty is eliminated by using the ordinary ground or static wires for the capacitance coupling and so arranging them that while the capacitance coupling may be used to illuminate the marker lights, the normal functioning of the static or ground wire will not be interfered with.

Figure 1:
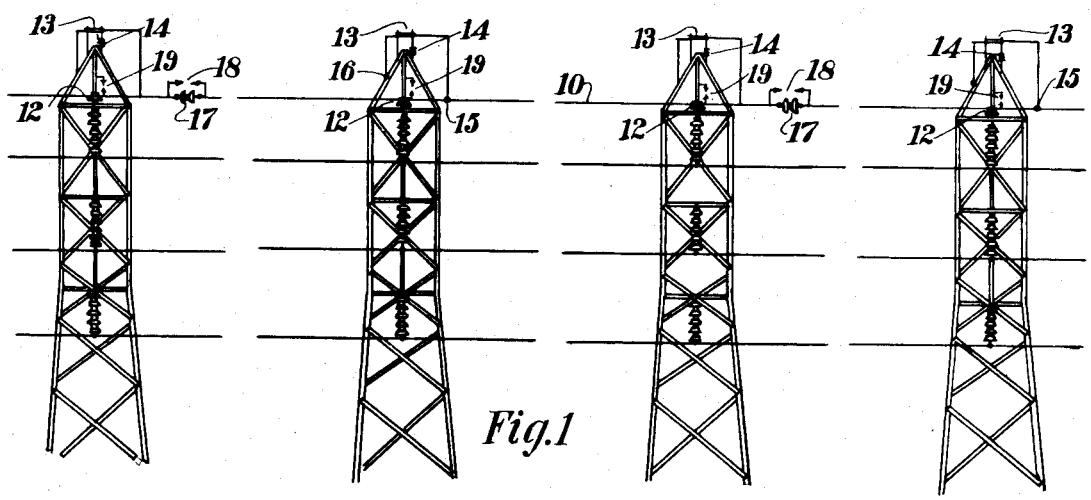
Fig. 1 is an elevation and Fig. 2 a top plan of a portion of the transmission line, having one embodiment of the present invention applied thereto.
Figure 2:
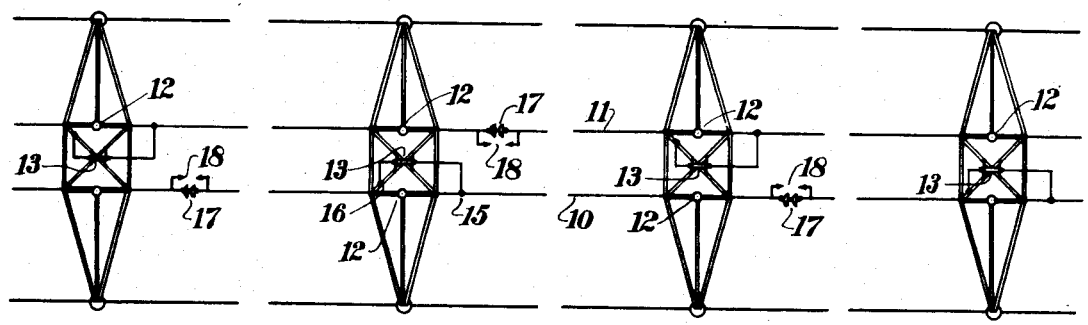

In the form of the invention shown in Figs. 1 and 2 the static or ground wires 10 and 11 are insulated from the towers by insulators 12. Lighting elements such as neon tubes 13 are insulated from the towers by insulators 14. One end of the neon light is connected to the conductor 10 at 15; the other end is grounded to the tower at 16. The conductor 10 is broken up into sections by insulators 17. This makes it possible to confine the charging current from a section of the ground wire 10 to a particular light or tube. In Figs. 1 and 2, two ground wires are shown and the charging current from two spans is used for a single lighting system. Other arrangements can, of course, be used where desired. With the arrangement shown, lights on adjacent towers receive their energy from different ground or static wires. This may be advisable in a two-circuit line for, otherwise, if one circuit were not energized, the illumination might be very poor. With the other circuit energized, however, every other tower would be well marked.

With this type of installation, it is necessary to provide certain equipment, as will now be more fully explained in order that normal functioning of the ground wire will not be interfered with and the lights will not be damaged. In order to permit normal functioning of the ground wire, sectionalizing insulators 17 are provided with limiting gaps 18 which will flash over at a relatively low voltage. The bridging of this gap under a transient produced by lightning will tend to eliminate the effect of the sectionalizing insulators and allow the ground wire to function on a normal basis. The supporting insulators 12 for attaching the ground wires to the towers are provided with limiting gaps 19 so that a high voltage on the ground wire produced by lightning or surge may discharge to ground. The discharge permits the functioning of the ground wire in a manner similar to that of a ground wire directly connected to the tower or to a lead running to ground; the installation of the limiting gap being similar to that shown in my Patent No. 1,914,394, June 20, 1933. The neon light or a step-down transformer for energizing this light is used in place of the impedance 17 in Fig. 2 of that patent, or in place of 17 and 31 in Figs. 7 and 8 of that patent. It is evident that the dissipation of energy in the neon or other lighting system would tend to damp out transients in a manner similar to the operation of the device of my prior patent. The sectionalizing of the ground wire would also produce the same benefits as in my patent cited above.

It is evident that the limiting gap 18, shunting the insulators 17, may be made quite small so that discharge will take place readily, permitting the ground wire to function on a normal basis as though continuous. By inserting a gap, however, or an impedance, it is possible to prevent a light in one section from taking the current from a light in another section. This is necessary as the lights of the neon type have a negative coefficient which prevents their use in multiple unless a series or balancing impedance is used with the light.

Figure 3:
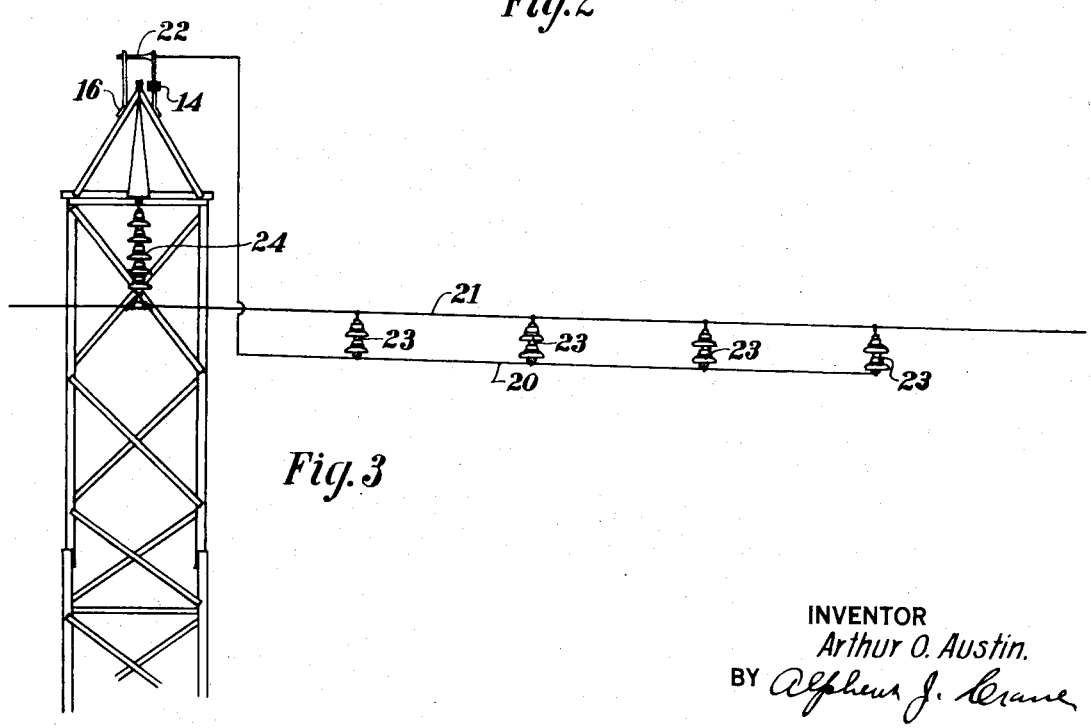
Fig. 3 is an elevation of a portion of a transmission line showing another form of the invention.

Several different arrangements for providing energy for the lights may be used, such as shown in Figs. 3, 4, 5 and 6. In Fig. 3 a conductor 20 is insulated from the main power conductor 21. Induced voltage and current in the conductor 20 can be applied directly to the lighting element 22. The insulation of the line may be materially reduced unless the insulators 23 correspond in amount of insulation to that provided by the main insulators 24.

Figure 4:
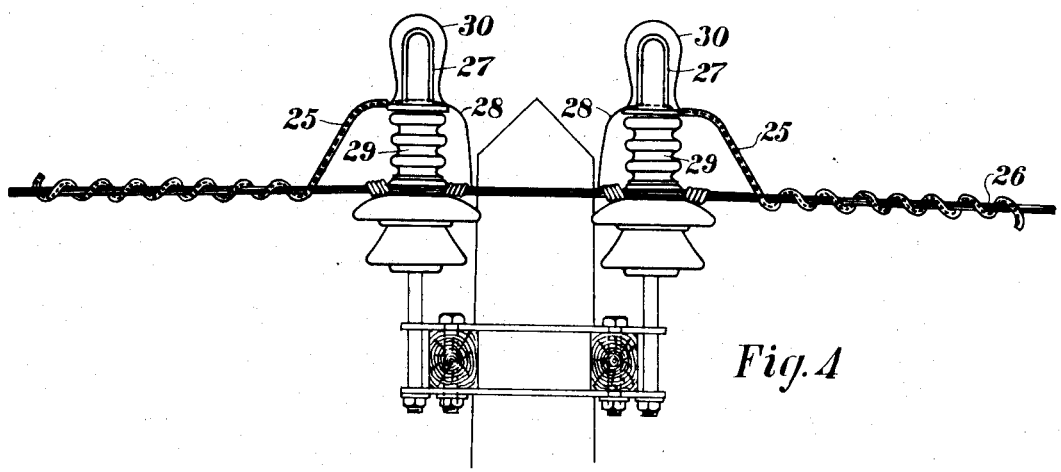
Fig. 4 is an elevation of a supporting structure for a transmission line having another form of the invention applied thereto.

In many cases the energy for the lighting elements may be produced by the transmission line without a reduction in insulation. In Fig. 4 a conductor 25 is placed parallel to or wrapped around the power conductor 26. The conductor 25 may be an insulated conductor having a rubber or weatherproof insulation which will provide sufficient induced voltage between conductors 25 and 26 for the operation of the lighting element 27. One end of the conductor 25 is connected to one end of the lighting element 27; the other end of the lighting element being connected to the conductor 26. The conductors 25 and 26, together with the insulation about the conductor 25, constitute a capacitor, the charging current for which passes from the conductor 26 through the lead 28 and the element 27 to the conductor 25. It is evident that this arrangement may be readily applied to existing lines. The application, however, particularly applies to lines having pin type insulators where the lighting elements may be mounted directly upon the insulators. The installation of the lights in this case does not reduce the effective insulation and requires that the lighting element be insulated only sufficiently to force the current through the lighting element. The insulator 29 may, therefore, be of a small size or may be in the form of a housing which will permit the installation of limiting gaps and impedances if so desired.

Figure 5:
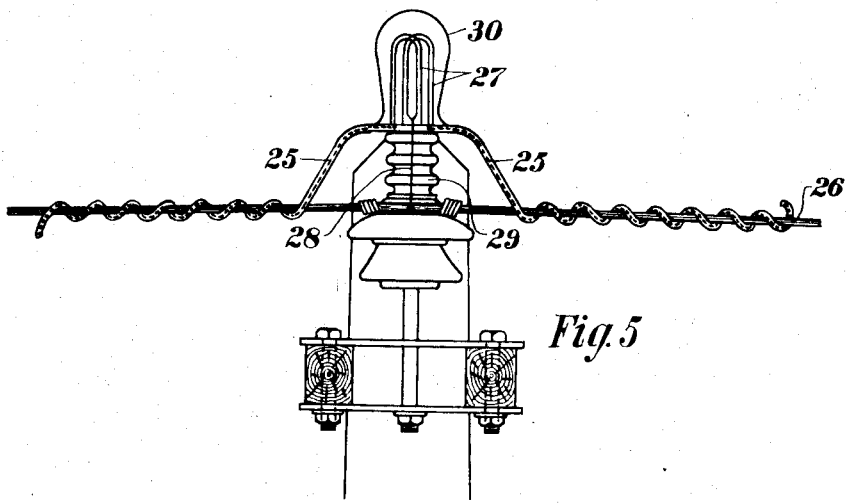
Figs. 5 and 6 are views similar to Fig. 4 showing other modifications.

Either a single lighting element or multiple or series lighting elements may be used. A protecting glass housing 30 is generally advisable. In many installations, two insulators may be used side by side, as illustrated in Fig. 4, and the arrangement duplicated for the second lighting element. It is evident, however, that two lighting elements may be placed on the single supporting insulator, as shown in Fig. 5; each individual lighting element 27 being connected to an individual supply member 25. These may be placed adjacent to each other or on opposite sides of the insulator, as desired. In this arrangement, the single supporting insulator 29 supports the lighting elements.

Figure 6:
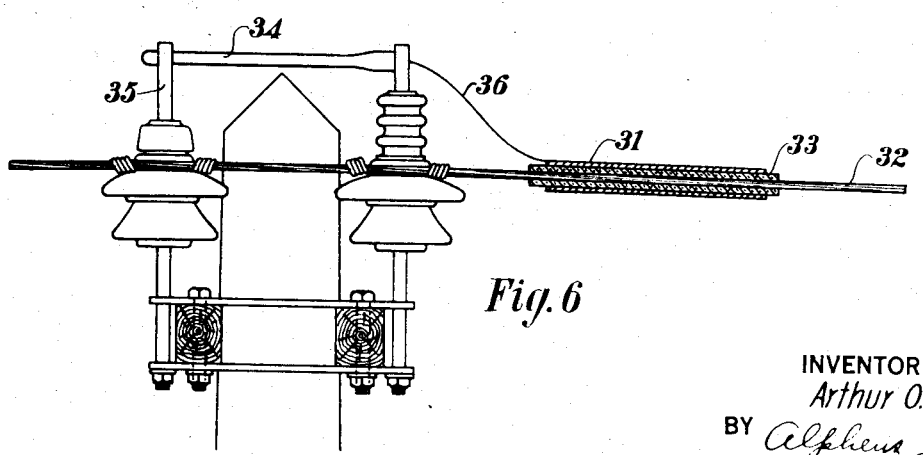

In Fig. 6 a sleeve 31 is insulated from the conductor 32 by suitable insulation 33, such as rubber, fibre or bakelite. In general, however, the member 31 is made in two parts or in the form of a spiral so that it may be readily applied to a conductor already in place, without the necessity of threading the conductor through the sleeve. Charging current for the sleeve 31 passes from conductor 32 through the lighting element 34 which has one end connected through its support 35 to the conductor 32 and its other end connected through jumper 36 to the capacitor 31. The member 31 may be in the form of a conductor cage, shown in my prior Patent No. 1,664,100. Used in this manner, the cage serves a double purpose, that of supplying energy for a lighting system and also tending to raise the effective flashover and reduce discharges from the conductor. Limiting gaps and protecting means to be described may be used in connection with the lighting elements which may be placed either out on the conductor or supported or hung from the main insulator.

Figure 7:
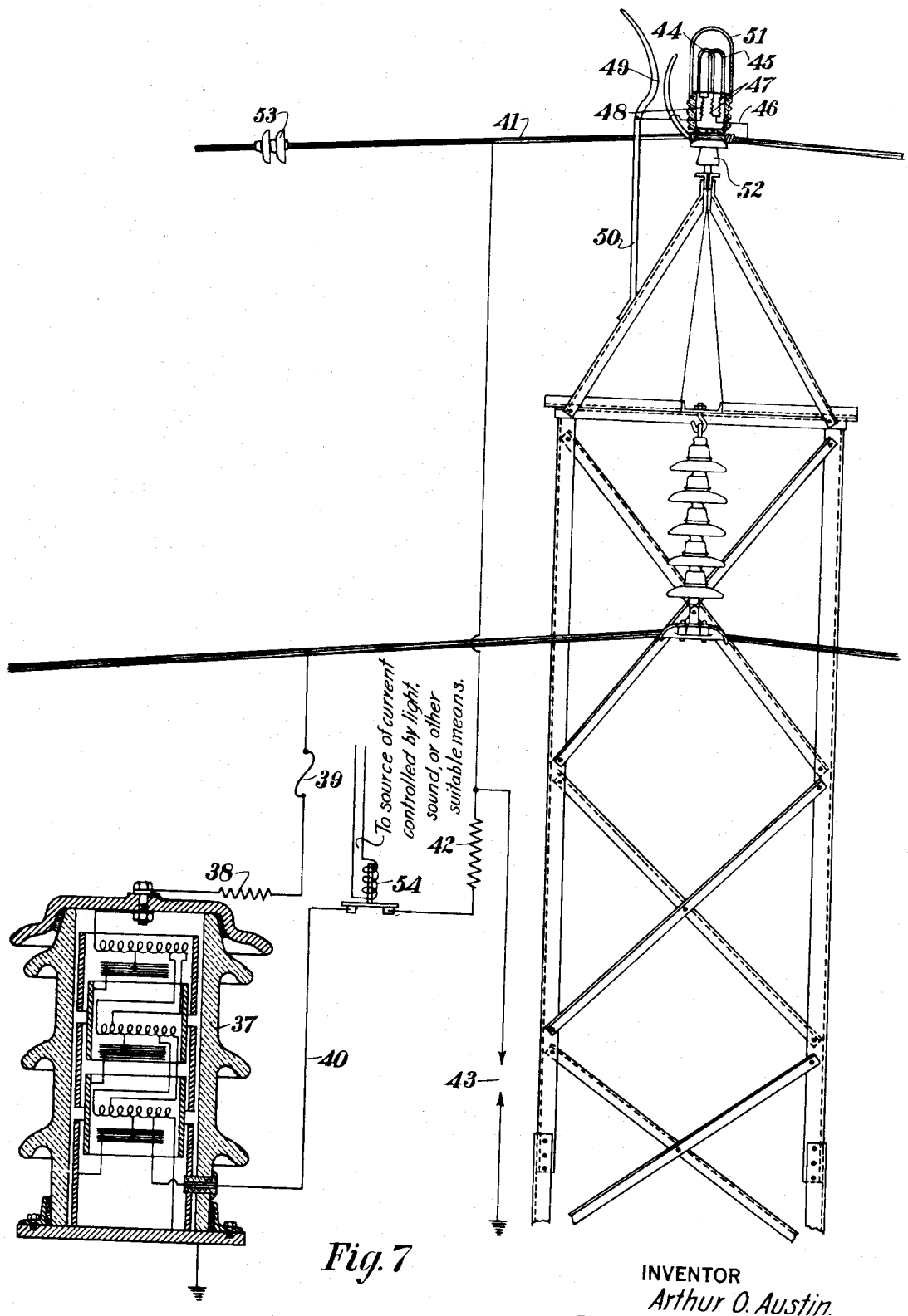
Fig. 7 is an elevation of a portion of a supporting structure for a transmission line, showing one form of the invention applied thereto.

In some cases, while there may be sufficient energy available for the lights, the current is so small that good illumination will not be obtained. In this case it may be advisable to use a transformer for increasing the current. This transformer may be of any suitable step-down type with primary and secondary or of the auto or chain connected types. By applying a suitable transformer, energy may be obtained directly from the line and distributed by the ground wire having limited insulation. One arrangement of this kind is shown in Fig. 7 in which a transformer 37, like that of my Patent No. 1,868,483, is connected to the line, preferably through an impedance 38 and fuse 39. The current from the secondary or low voltage side of the transformer 37 is carried by the lead 40 to the insulated ground wire or conductor 41. A suitable impedance 42 may be used with a limiting gap or arrester 43 for the protection of the transformer 37. The transformer 37 may be made of any suitable voltage and output. With this arrangement a number of lighting elements will be supplied with energy from a single source. It is also unnecessary to obtain the energy from electrostatic induction.

Where the ground wire is used for supplying energy for the lighting elements, means may be used for protection of the lighting elements, as will be described. The discharge gaps, permitting the normal functioning of the ground wire, will be used, similar to that shown in my prior application Serial Number 301,538 now Patent No. 1,914,394 granted June 20, 1933. The lighting elements 44 and 45 will be supplied with energy from the insulated ground wire or conductor 41 through lead 46 and series resistances 47. The other ends of the lighting elements are connected through resistance 48 to ground. The lighting elements may be placed in series, as in a series arc light circuit. The preferable method, however, is to place the elements in multiple, as shown in the drawings, using probably not less than two lighting elements per structure unless the structures are near together. By placing suitable impedances 47 in series with the elements, the proper distribution of energy will be obtained for the lighting elements used in multiple. A limiting gap 49 is used to permit the conductor 41 to function as a ground wire and can be constructed so that its grounded terminal 50 acts as a lightning rod to protect the lighting elements 44 and 45 and the housing 51. The conductor 41 is insulated from the ground by insulators 52 and sectionalized by insulators 53; the insulators 53 being placed at each end of the section of the conductor 41 which it is desired to energize by the transformer 37. This arrangement has advantages where an effective illumination is desired, particularly within a restricted area or where it is difficult to obtain sufficient electrostatic coupling.

With a single source of power for several lights, as illustrated in Fig. 7, it is very easy to provide relays which can be operated in any suitable manner so that energy will not be supplied to the lights except when needed. A relay 54 is placed in the lead 40 and may be operated by a photo-electric cell or other suitable means which will cause the circuit to be opened during daylight hours and cause the circuit to be closed so as to illuminate the markers at night or when the light becomes insufficient for good visibility. If desired, the lighting may be controlled by a switch, operated in any suitable manner.

The method of constructing the transformer permits of a high degree of reliability at minimum cost. Poor regulation of the transformer is generally an advantage rather than a disadvantage where gas filled lights are used, such as neon or mercury lights. The transformer 37 may be placed at any suitable location, either on the ground or up in the tower or supporting structure, as desired. By using a sectionalized ground wire, it is possible to supply any desired amount of energy to markers without the use of special conductors in many cases. The method not only makes it possible to supply adequate energy but eliminates the necessity of electrostatic coupling at a large number of points. By the use of a few relays, it is also possible to save much energy until needed. If relays operated by the sound from the exhaust of air craft are used, the towers may be illuminated only when noise, produced by an approaching air craft, reaches a given volume. With relays operated by noise, it is possible to provide ground illumination when needed. For a given cost, the higher air structures are continuously illuminated over long periods of time.

Figure 8:
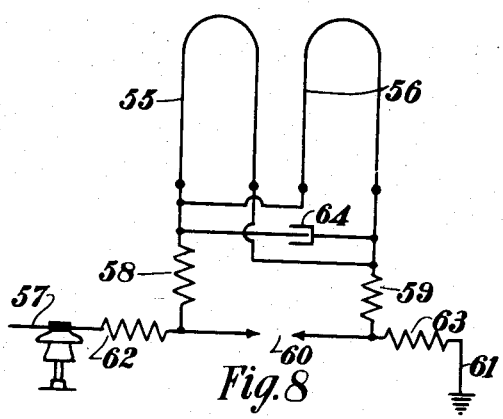
Figs. 8, 9 and 10 are diagrammatic views showing different connections for the lighting elements.

In order to prevent a heavy discharge through the lights, due to lightning or transients on the transmission line, an arrangement is used similar to that shown in Fig. 8 in which the lighting elements 55 and 56 are shown connected in multiple. The lighting elements are of course sufficiently insulated from ground so that the current may be forced through them. The lead 57 attached to one terminal is connected to the insulated section of the ground wire or other source of energy. In series with this lead, an impedance 58 is placed between the lead and the neon or other lighting elements. The other terminal of the lighting elements is connected to the tower or ground, either directly or through an impedance 59. A limiting or discharge gap 60 is placed between the incoming lead 57 and the ground lead 61. If a very small gap 60 is used, which may be damaged by a discharge from a heavy transient or lightning, this gap may be further protected by impedances 62 and 63. Either one or both of these impedances may be used.

If desired, a condenser 64 may be placed across the lighting elements or at an intermediate point in the impedances 58 and 59. The condenser tends to prevent the flow of charging current and increases the drop over the series impedances. This permits the gap 60 to discharge without producing so much voltage or current, affecting the lighting elements. In general, however, a series impedance will be sufficient to provide protection.

Figure 9:
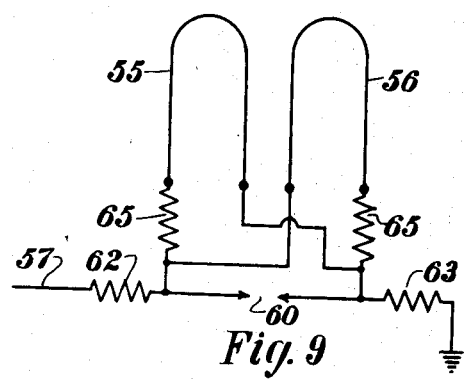

The protecting scheme may be used to distribute the current of the two lighting elements, where there is sufficient energy, by the connection shown in Fig. 9 in which an impedance 65 is placed in series with each lighting element used, thereby causing the current to be distributed.

Figure 10:
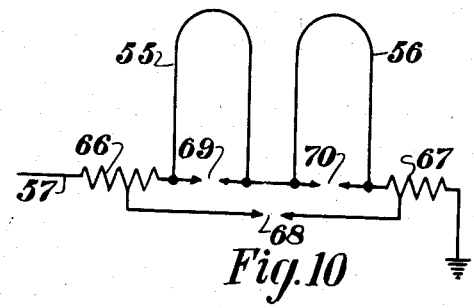

Fig. 10 shows a series arrangement of lights in which the series impedances 66 and 67 may be partially or entirely shunted by a gap which will discharge and relieve the elements 55 and 56 from excess voltage or current. The gap 68 may have one side connected directly to ground and the other side connected to the lead 57, or it may be connected at some intermediate points on the impedances 66 and 67. It is evident that the impedances 66 and 67, as well as 58, 59, 62, 63 and 65, may be suitable resistances, reactances or condensers, as desired, or a combination of same. Where resistances are used, some energy will be dissipated but in the case of a transient produced by lightning, the danger of a heavy discharge through the lighting elements will be greatly reduced over that where a condenser is used. Gaps or relays 69 and 70 are arranged to shunt a light which fails. Any suitable arrangement such as that used in series arc lighting circuits or a simple discharge gap may be used for this purpose. The use of a discharge gap will tend to produce radio interference and provide an easy means of detecting a faulty light. The limiting gaps may be regarded as lightning arresters and hence any suitable type of lightning arrester may be substituted for the gaps which will permit relief under the abnormal conditions and force at least the major part of the current through the lights under normal operating conditions. Where the line is comparatively free from high voltage transients, which will damage the lighting elements or where lightning is of rare occurrence only, the protecting means may be dispensed with. Owing to the ground wire localization of the discharge, due to sectionalizing of the ground wire, lightning would damage lights only in the immediate vicinity. A rare occurrence under this condition would not be a serious matter as the lights on adjacent towers would indicate the general location of the transmission line until such time as the lights could be replaced.

Where the highest degree of reliability, however, is desired, it is necessary to provide means which will afford protection to the lights. The series impedances in combination with limiting gaps or arresters can be so proportioned that the discharge through the lights will be held within safe bounds. This applies to the lighting system regardless of how they are energized, if they are to be subjected to transients induced by lightning, switching surges or accidental contact with other sources of energy which will apply destructive voltage or current. From the standpoint of economy, it is advisable to use as few lighting elements as possible.

The arrangements shown in Figs. 8, 9 and 10 tend to increase the reliability of the marker system where multiple elements are used or where a single element is used. It is evident that in order to produce reliability, a single element must be visible in practically all directions. This generally requires an installation at or near the peak of the tower, which is the point most likely to be struck by lightning. In order to be visible in all directions, the light should not be obstructed by the tower or supporting structure.

Figure 11:
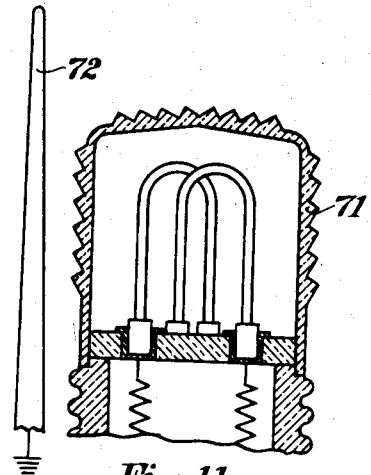
Figs. 11 and 12 are vertical sectional views of different forms of lighting elements.

One means of providing reliability is to place the lighting elements in a glass housing; one form being illustrated in Fig. 11. The protecting housing 71 may be made of glass or any suitable transparent material and provided with prismatic surfaces so that light will be visible from all directions and above, as well as below. If desired, a lightning rod or rods 72 may be placed at one side of the housing and project above the housing so as to take a direct discharge. The housing, however, if made of good dielectric strength, would prevent a direct hit to the lighting elements. If the housing is placed below the peak of the tower, the lightning rod or protecting screen may be unnecessary.

Figure 12:
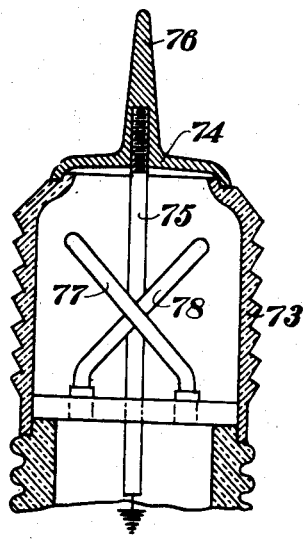

The protecting housing may be made in a single piece or several pieces. If made in the form of a cylinder 73 and provided with an opaque cover 74, as shown in Fig. 12, the housing should be so formed that light will be visible above and not entirely obstructed by the opaque shield 74. With this arrangement, the shield 74, if made of metal, can be connected to ground through a rod or conductor 75 for carrying off current due to a direct hit. If desired, a projection 76 may be provided for taking the discharge. The elements 77 and 78 may be disposed at an inclination, as shown, or in any convenient manner so as to give light in all directions. One suitable arrangement of these elements is in the form of a spiral so that they will send out light from all sides of the housing 73. In most cases, a simple closed glass chamber of good mechanical strength will provide all the protection necessary from birds, hail, sleet or rain. The housing will, at the same time, tend to protect impedances, limiting gaps or relays which may be used.

I claim:

1. The combination with a high potential transmission line conductor and its supporting means, of a supplemental conductor mounted on said supporting means and paralleling said transmission line conductor, said supplemental conductor being divided into sections insulated from one another, said sections being provided with means for supplying electrical energy thereto from said transmission line conductor, light radiating means mounted on said supporting means and electrically connected with one of said sections and energized thereby independently of other sections of said supplemental conductor.

2. The combination with a high potential transmission line conductor and its supporting means, of a supplemental conductor mounted on said supporting means and paralleling said transmission line conductor, insulators dividing said supplemental conductor into sections, means for supplying energy to one of said sections from said transmission line conductor independently of other sections thereof, light radiating means mounted on said supporting means and electrically mounted with the one of said sections supplied with energy from said transmission line conductor.

3. The combination with a high potential transmission line conductor and its supporting means, of a supplemental conductor mounted on said supporting means and paralleling said transmission line conductor, insulators separating said supplemental conductor into sections, light radiating means mounted on said supporting means and electrically connected with one of said sections for receiving energy therefrom, a transformer having its primary electrically energized from said transmission line conductor, the secondary of said transformer being also connected with the one of said sections from which said light radiating means receives energy, said section being energized from said secondary, and means for controlling the connection between the secondary of said transformer and the section of said supplemental conductor connected therewith.

4. The combination with a high potential transmission line conductor and its supporting means, of a supplemental conductor mounted on said supporting means and paralleling said transmission line conductor, said supplemental conductor being insulated from said transmission line conductor and from ground, an arcing gap between said supplemental conductor and ground and adapted to break down under abnormal voltages and enable said supplemental conductor to serve as a ground wire, insulators separating said supplemental conductor into sections, light radiating means mounted on said supporting means and electrically connected with one of said sections for receiving energy therefrom, a transformer having its primary electrically energized from said transmission line conductor, the secondary of said transformer being connected with the one of said sections from which said light radiating means receives energy and supplying energy to the section with which it is connected, independently of other sections of said supplemental conductor.

ARTHUR O. AUSTIN.